Sept. 17, 1935.  T. ZIMMERMAN ET AL  2,014,605
MEANS FOR FORMING ROLLER BEARING CUPS
Filed July 10, 1933  3 Sheets-Sheet 1

INVENTOR
THOMAS ZIMMERMAN,
ALBERT SCHRIEBER,
BY
ATTORNEYS

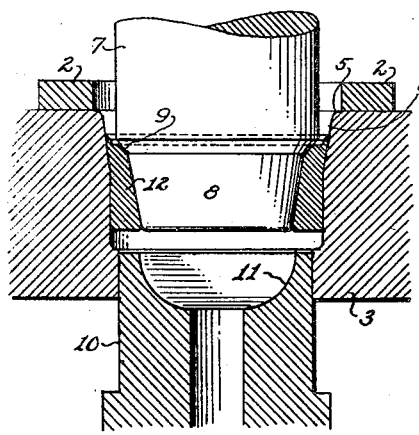
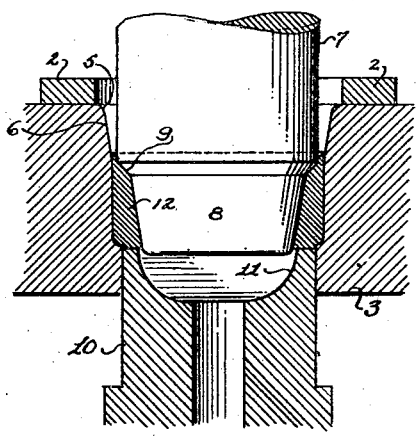
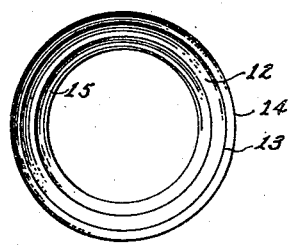
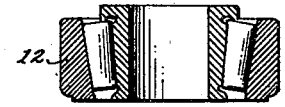
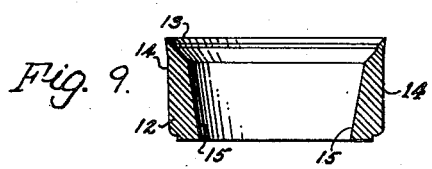
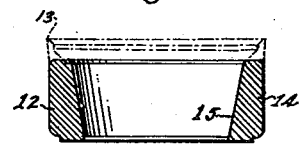
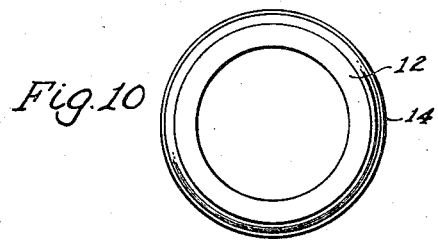

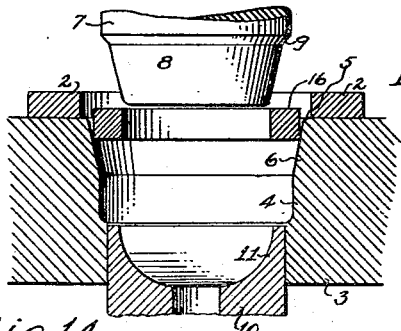
Fig.14.
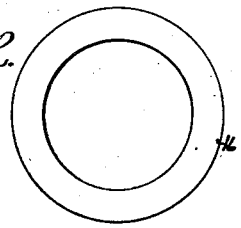
Fig.12.
Fig.13.
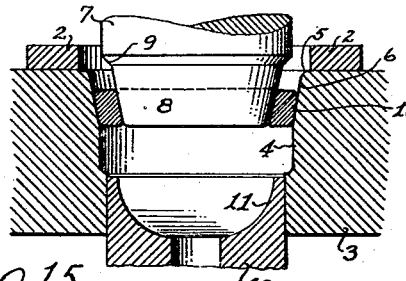
Fig.15.
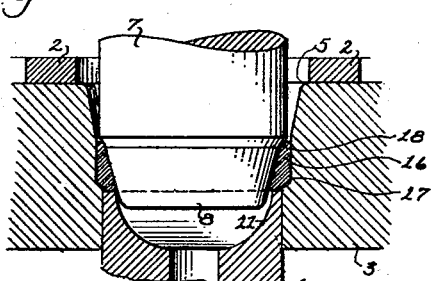
Fig.18
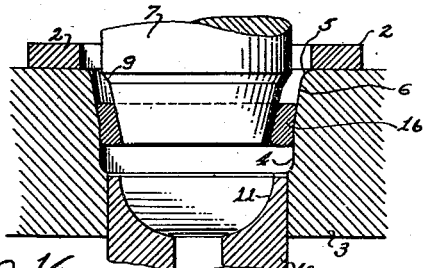
Fig.16.
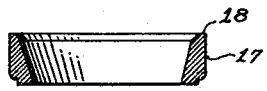
Fig.19.
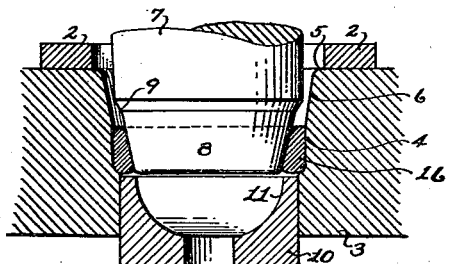
Fig.17.
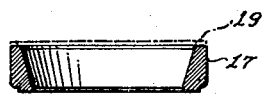
Fig.20.
INVENTOR
THOMAS ZIMMERMAN,
ALBERT SCHRIEBER,
BY
ATTORNEYS Patented Sept. 17, 1935

2,014,605

UNITED STATES PATENT OFFICE 2,014,605

MEANS FOR FORMING ROLLER BEARING CUPS

Thomas Zimmerman and Albert Schrieber, Detroit, Mich., assignors to Bower Roller Bearing Co., Detroit, Mich., a corporation of Michigan Application July 10, 1933, Serial No. 679,726

1 Claim. (Cl. 78—60)

This invention relates to means for carrying out the new and novel process or method disclosed in our co-pending application, Serial No. 653,871, and which means is especially adapted to the manufacture of cups for roller bearings and similar members, and an object of the invention is to effect a saving in time and material, and to produce a cup body of better texture due to the drawing and compacting of the metal during the forming operation.

A further object is to effect a further saving by eliminating the necessity for certain machining operations, the cup being formed by punch and die operations, into substantially the desired form and with very smooth, compact inner and outer surfaces, thereby securing a further saving of time in the grinding of these surfaces, and producing a cup having maximum wearing qualities and which is less liable to crack or develop flaws during the forming or other operations, waste due to such defects being thereby reduced to the minimum.

It is also an object, to effect a saving in blank material by adapting the forming instrumentalities to the use of a blank of a particular form which may be readily stamped from sheet metal, and utilizing the central portion removed in forming one blank, to form a blank for a cup of a different dimension.

Other objects and advantages will become apparent by reference to the accompanying specification and drawings wherein—

Figs. 4, 5, 6 and 7 are sectional views similar to Fig. 3 and illustrating succeeding steps in the forming operation;

Fig. 8 is a plan view of the cup as formed in the dies shown in Figs. 3 to 7 inclusive;

Fig. 9 is a transverse section of Fig. 8;

Fig. 10 is a bottom end elevation of Fig. 9;

Fig. 11 is a transverse section of a finished cup and illustrating in dotted lines, the portion removed therefrom by a machining operation;

Fig. 11a is a transverse section of a roller bearing illustrative of an assembly embodying the finished cup;

Figs. 12 and 13 are views similar to Figs. 1 and 2, of a blank of slightly modified form;

Figs. 14, 15, 16, 17 and 18 are sectional views of a die with a punch shown in elevation, illustrative of succeeding steps in the formation of the blank shown in Figs. 12 and 13, into cup form;

Fig. 19 is a transverse section of the cup formed by the preceding steps illustrated in Figs. 14 to 18 inclusive; and Fig. 20 is a transverse section of the finished cup, illustrating by dotted lines, the final machining operation.

In forming bearing ring cups by the old process commonly employed there is a large amount of metal wasted, not only in the several machining operations, but the bottom punching is also waste as it is not left in such condition after the cupping and punching operations that it can be used as a blank for a cup of lesser dimensions. Further, a blank of comparatively large diameter is required due to the fact that in the cupping operation, the peripheral edge portion of the blank is drawn inwardly to form the annular cup wall, and this drawing or inward folding action, disrupts the grain of the metal, often causing cracks and flaws in said wall which appear when the machining operations are performed, thus necessitating the discarding of the product and further increasing the amount of waste and loss of time. Further, it is well understood that in such old cupping operation, due to the strain imposed where the cup bottom joins the side wall, and to the hardening of the metal particularly at this point, the metal is extremely liable to crack or tear. After the machining operations have been performed, a boring operation is performed to give the desired internal diameter to the cup, and it is also usually necessary to grind this surface to make it perfectly smooth for the rolls shown in Fig. 11a to run thereon, and in some cases it may also be found necessary to grind the exterior of the cup wall.

Figure 1:
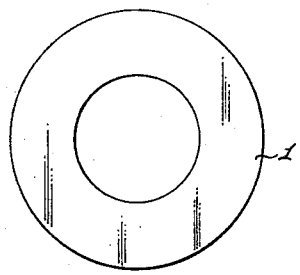
Figure 1 is a plan view of a blank suitable for use in connection with the present means embodying the present invention.
Figure 2:
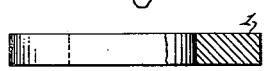
Fig. 2 is an edge view, partly broken away and in section, of the blank shown in Fig. 1.

By the use of the present means for forming cups, as illustrated in Figs. 1 to 7, inclusive, the above pointed out losses and defects are overcome, in that, in the beginning, as illustrated in Figs. 1 and 2, a ring-form of blank I is employed, the external diameter of which is but slightly greater than the desired external diameter of the finished cup to be formed therefrom. This ring shaped blank is preferably struck from a sheet of metal, and, therefore, the disk of metal removed from the center of this ring-shaped blank, is left in such condition that it may be used to form a blank for a cup of lesser dimensions.

Figure 3:
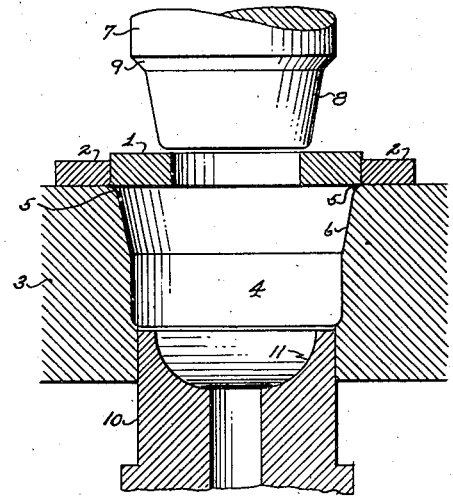
Fig. 3 is a sectional view of a die with the blank shown in section and in place thereon, together with a punch shown in elevation, to illustrate the position of the parts at the beginning of the forming operation.

As illustrated in Fig. 3, this ring-shaped blank 1 is placed within the centering member 2 secured upon the die block 3 to hold the blank centered axially with the bore or chamber 4 in the block and with the peripheral lower corner of the blank resting upon the block where the outwardly curved upper end or corner 5 of the downwardly and inwardly tapered upper end portion 6 of the bore, merges into the upper surface of the die block. The taper of the portion 6 of the bore is small, and, therefore the external diameter of the blank need be but little greater than the diameter of the straight lower end portion 4 of the bore which portion determines the outer diameter of the annular wall of the member formed in the die by the descent of the punch 7, this punch being formed with a downwardly and inwardly tapered lower end portion or truncated conical end 8 conforming to the taper of the portion 6 of the bore and which portion 8 joins the body of the punch in a beveled or downwardly inclined shoulder 9, the diameter of the upper end of the portion 8 being considerably less than the diameter of the punch body above, and less than the diameter of the bore, leaving a space between punch and bore wall when the punch descends into the bore, which space is of a width transversely, equal to the desired thickness of the ring member to be formed within the die.

Figure 4:
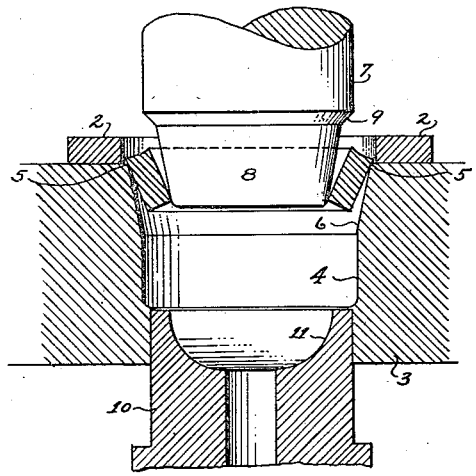
Figure 5:
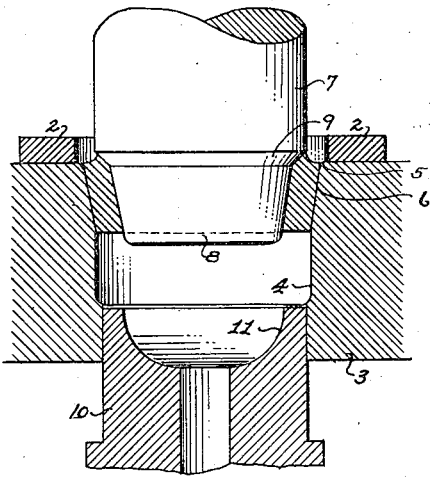

Descent of the punch 7, depresses the center portion of the blank, said blank turning upon the shoulder 5 as shown in Fig. 4, this step which might be designated as turning the ring blank inside out, being the first step of the forming operation. This operation but slightly decreases the external diameter of the blank, but does, in depressing the central portion of the blank, expand or stretch the metal from the central opening in the blank, outwardly. As shown in Fig. 5 upon further downward movement of the punch, the inclined surface of its conical lower end portion moves toward the correspondingly inclined surface of the conical bore and the blank which has just been turned so that it, in the direction of its width, is correspondingly inclined and is caught between these surfaces, and compressive force is gradually applied to the blank as the punch descends, the shoulder 9 on the punch coming into contact with the upper end edge of the ring thus formed, forcing it to move down with the punch. As the lower end of the punch is projected into the upper end of the straight part of the bore as shown in Fig. 6 the ring blank is forced past the meeting angle of conical and straight portions of the bore thus gradually drawing the metal and elongating the ring in the direction of its axis or width. Further downward movement of the punch further increases the ring in width by causing the metal to flow, and this takes all tension out of the metal and compacts it, putting it in the best possible condition for use in a roller bearing cup, eliminating flaws from the body or wall and all tendency to crack. This forming action upon the metal as the blank is forced downward from the tapered into the straight bore, is so gradual, due to the tapering form of both punch and die, that the grain of the metal is not disrupted but is formed with a gradually applied drawing and compressing action which causes the metal to flow. This action is very essential in forming a bearing cup from a ring blank by one continuous downward movement of the punch, as otherwise the grain of the metal will be disrupted, causing the formation of minute cracks in the body of the formed cup. The final downward movement of the punch illustrated in Fig. 7, forms the lower end edge of the ring to the desired form for use as a bearing cup, by forcing it against the formed lower end of the die bore and against the upper formed end edge of a plug 10 for closing the lower end of the bore, this plug being cupped or recessed as at 11 to permit the extreme lower end of the punch to project slightly beyond the formed ring after said ring has come to seat in the lower end of the bore and upon said plug.

This limited advance of the lower end of the punch through the formed ring member, which is indicated as a whole by the numeral 12 and is shown in detail in Figs. 8 to 10, advances the punch shoulder 9 in contact with the upper end edge of ring member and applies a final impact which, by reason of the blank being compressed except at said shoulder, causes the metal to flow upwardly and the excess to flow up between said shoulder and punch body surfaces at the lower end of the tapered portion of the bore as shown in Fig. 7, forming an internally tapered annular flange 13 on the upper end edge of the annular wall 14 of the ring member, this final impact not only causing a flow of the metal but also forming the blank to the desired cross sectional ring form.

The metal drawing operation or action which takes place when the partly formed ring member is forced downward in the bore in contact with the tapered and straight portions of the bore, produces a very smooth external surface upon the wall 14, and the straight portion of the bore forms this external surface exactly parallel with the axis of the ring 12, which is the desired form for the finished cup. The tapered or truncated conical end portion 8 of the punch confines the metal between it and the wall of the bore, and the drawing action which takes place as the punch descends, causes the ring to accurately conform to the taper of this punch end, giving a very smooth compacted inner tapered ring surface 15 which closely conforms to the desired internal shape for the finished bearing cup. Little internal boring of the ring to bring it to the desired diameter, and usually no grinding of the external surface is therefore necessary, and these surfaces hold to substantially the exact desired diameters as the tendency of the ring to change its form by expansion or contraction after being removed from the die, is eliminated by the drawing and compacting of the metal during the forming operation.

The final steps in making the cup are therefore, one machining operation to remove the flange 13, as indicated in Fig. 11, and an internal grinding operation to finish the surface engaged by the rolls in the bearing assembly shown in Fig. 11a. Waste of stock is therefore reduced to the minimum, particularly as the disk of stock removed from the center of the ring blank is left in such condition that a ring blank from which to form a cup of lesser dimensions, may be blanked, particularly a ring blank of the modified form shown in Figs. 12 and 13.

To form a bearing cup from the ring blank 16 shown in Figs. 12 and 13, the previously described method or process is modified somewhat in that the step indicated in Fig. 4 and described as the step of punching the ring blank to "turn it inside out", is eliminated, this step being unnecessary due to the fact that the body of the ring blank 16 is much less in horizontal or transverse width than that of the ring blank 1 and also that the depth or height of the bearing cup to be formed therefrom, is much less than that of the cup shown in Fig. 11. Outside of this difference, the process shown in Figs. 14 to 18 inclusive, is substantially the same as that shown in Figs. 3 to 7, inclusive.

As shown in Fig. 14, the ring blank 16 is first placed beneath the lower tapering end portion 8 of the punch 7 within the upper end of the tapered portion 6 of the bore of the die block 3, said blank being of lesser external diameter than the diameter of said upper end of said tapered bore so that said blank will engage at its lower peripheral corner, the tapering wall of the bore adjacent its upper end and thus be supported and centered in the bore.

The lower end of the end portion 8 of the punch is of substantially the same diameter as the internal diameter of the ring blank, and, therefore upon descent of the punch, its lower end will enter the blank, centering and confining it between punch and inclined wall of the bore and forcing it downward within the tapered portion of the bore with a gradual forming action and then as it passes down within the straight portion, compressing and drawing the partially formed ring, as illustrated in Figs. 15 to 18 inclusive, the last end of this down movement of the punch or plunger, as shown in Fig. 18, seating the lower end of the wall 17 of the formed ring, at the bottom of the straight portion 4 of the bore and upon the annular end portion of the plug 10 surrounding the cup or recess 11 in said end of said plug, and thus accurately shaping this lower end of said wall 17 to the desired form, the punch continuing its down movement for a short distance after such seating, to project the lower end of the punch a short distance into said recess 11 and to bring its shoulder 9 into contact with the upper end edge of the wall 17 to confine said annular wall within the space between the straight portion of the wall of the bore and the tapered end portion 8 of the punch, thus drawing and compressing the metal and at the same time permitting the excess to flow up against the shoulder 9 between it and the bore wall. This limited annular flange 18 thus formed on the upper end edge of the wall 17 as shown in Fig. 19, may, thereafter be removed by a machining operation as indicated at 19 in Fig. 20.

The ring blank 16 is thus formed within the die by a gradually applied drawing and compressing action, into substantially the desired cup-form so that but a limited amount of machining or grinding is necessary to give it the desired dimensions and cross-sectional form, and the metal, during the several forming steps, is so changed in its texture that flaws or tendency to crack, split or disintegrate are eliminated, and very smooth, compact surfaces having long wearing qualities will be formed during the forming operations and of accurate dimensions which will not be materially changed by contraction or expansion of the metal after the forming operation is completed.

Obviously the configuration of the die bore and punch may be changed to produce cup rings of a different size and form from that shown, without departing from the present method or means or from the spirit of the present invention, such changes falling within the scope of the claim presented herewith, and which changes are contemplated.

What we claim is:—

Means for forming an annular cup for a roller bearing, said means including a die block formed with a bore having a conical upper end portion of upwardly increasing diameter with the upper end of the wall of said bore curved and merging into the upper surface of the block; a locator member secured upon said block and having a circular opening to receive an annular blank and hold the same with the peripheral corner of said blank resting upon said block where the curved upper end of said bore merges into said upper surface of said block, said bore being formed with a cylindrical lower end portion forming a continuation of the conical portion of said bore, the lower end of the wall of said cylindrical bore being curved inwardly to form an annular seat for the lower end portion of a cup to be formed in said bore; and a punch formed with a lower truncated conical end portion conforming in inclination to the inclination of the conical end portion of said bore, and with an inwardly and downwardly inclined shoulder at the upper end of said conical end portion to engage the upper end of said member formed in said bore and to force said member downwardly in said conical bore while being gradually compressed between said conical bore and punch surfaces and to force said member downwardly within said cylindrical bore and gradually forming the same between the surface of said bore and conical surface of said punch, and to seat at its lower end upon said annular seat at the lower end of said bore, said inclined shoulder on said punch being of lesser diameter than the diameter of said bore to permit excess metal of said member to flow upwardly around said shoulder; and a plug to close the lower end of said bore and form an annular seat for the lower end of the member formed in said bore, said plug being recessed to receive the extreme lower end of said punch when the same reaches the extreme lower end of its movement, said plug being movable upwardly within said die to eject the formed cup therefrom.

THOMAS ZIMMERMAN.
ALBERT SCHRIEBER.